United States Patent
Jurey et al.

(10) Patent No.: US 10,152,105 B2
(45) Date of Patent: Dec. 11, 2018

(54) COMMON CONTROLLER OPERATING MULTIPLE STORAGE DRIVES

(71) Applicant: Seagate Technology LLC, Cupertino, CA (US)

(72) Inventors: Phil Jurey, Longmont, CO (US); Jerry Dallmann, Westminster, CO (US); John Shaw, Frederick, CO (US); Tony Pronozuk, Loveland, CO (US); Steve Williams, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 303 days.

(21) Appl. No.: 14/676,612

(22) Filed: Apr. 1, 2015

(65) Prior Publication Data

US 2015/0362968 A1 Dec. 17, 2015

Related U.S. Application Data

(60) Provisional application No. 62/012,219, filed on Jun. 13, 2014, provisional application No. 62/012,205, filed on Jun. 13, 2014.

(51) Int. Cl.
*G06F 1/26* (2006.01)
*G06F 1/28* (2006.01)
(Continued)

(52) U.S. Cl.
CPC ............. *G06F 1/28* (2013.01); *G06F 1/3203* (2013.01); *G06F 1/3221* (2013.01);
(Continued)

(58) Field of Classification Search
CPC .... G06F 11/2015; G06F 11/2094; G06F 1/28; G06F 1/3221; G06F 1/3287;
(Continued)

(56) References Cited

U.S. PATENT DOCUMENTS 3,958,088 A 5/1976 Vieri
5,504,882 A 4/1996 Chai et al.
(Continued)

FOREIGN PATENT DOCUMENTS

WO 2014-065841 A1 5/2014

OTHER PUBLICATIONS

Caulfield, et al., "Moneta: A High-performance Storage Array Architecture for Next-generation, Non-volatile Memories," Dept. of Computer Science & Engineering, U.C. San Diego, California, 2010, 11 pages.

(Continued)

*Primary Examiner* — Abdelmoniem I Elamin
(74) *Attorney, Agent, or Firm* — Holzer Patel Drennan

(57) ABSTRACT

A mass data storage system includes a number of communicatively coupled storage drives powered by one or more power supplies. A common controller selectively connects power and a data signal to a desired storage drive via instructions within a control signal received by the common controller. The common controller includes switches that selectively connect power to a voice coil motor and a spindle motor of the desired storage drive. The common controller further includes a switch that controls the preamp of the desired storage drive and a switch that controls the flow of data to and from the desired storage drive.

19 Claims, 4 Drawing Sheets

(51) Int. Cl.
*G06F 1/32* (2006.01)
*G06F 3/06* (2006.01)
*G06F 11/20* (2006.01)

(52) U.S. Cl.
CPC .......... *G06F 1/3287* (2013.01); *G06F 3/0604* (2013.01); *G06F 3/0619* (2013.01); *G06F 3/0625* (2013.01); *G06F 3/0634* (2013.01); *G06F 3/0635* (2013.01); *G06F 3/0658* (2013.01); *G06F 3/0659* (2013.01); *G06F 3/0665* (2013.01); *G06F 3/0685* (2013.01); *G06F 3/0689* (2013.01); *G06F 11/2015* (2013.01); *G06F 11/2094* (2013.01); *G06F 2201/805* (2013.01); *Y02B 70/123* (2013.01); *Y02D 10/154* (2018.01)

(58) Field of Classification Search
CPC ............. G06F 2201/805; G06F 3/0604; G06F 3/0619; G06F 3/0625; G06F 3/0634; G06F 3/0635; G06F 3/0658; G06F 3/0659; G06F 3/0665; G06F 3/0685; G06F 3/0689; Y02B 70/123; Y02D 10/154
See application file for complete search history.

(56) References Cited

U.S. PATENT DOCUMENTS

| | | | |
|---|---|---|---|
| 5,678,023 | A | 10/1997 | Adams et al. |
| 5,778,374 | A | 7/1998 | Dang et al. |
| 6,310,815 | B1 | 10/2001 | Yamagata et al. |
| 6,332,139 | B1 | 12/2001 | Kaneko et al. |
| 6,560,155 | B1 | 5/2003 | Hush |
| 6,766,420 | B2 | 7/2004 | Rawson, III |
| 6,959,399 | B2 | 10/2005 | King et al. |
| 6,986,075 | B2 | 1/2006 | Ackaret et al. |
| 7,124,272 | B1 | 10/2006 | Kennedy et al. |
| 7,210,005 | B2 | 4/2007 | Guha et al. |
| 7,237,129 | B2 | 6/2007 | Fung |
| 7,318,164 | B2 | 1/2008 | Rawson, III |
| 7,334,140 | B2 | 2/2008 | Jones et al. |
| 7,434,090 | B2 | 10/2008 | Hartung et al. |
| 7,443,759 | B1 | 10/2008 | Rowlands et al. |
| 7,516,348 | B1 | 4/2009 | Ofer |
| 7,568,122 | B2 | 7/2009 | Mechalke et al. |
| 7,673,167 | B2 | 3/2010 | Elliott et al. |
| 7,699,023 | B2 | 4/2010 | Chen et al. |
| 7,702,853 | B2 | 4/2010 | Hetzler et al. |
| 7,859,834 | B2 | 12/2010 | Fukuda et al. |
| 8,024,602 | B2* | 9/2011 | DeCenzo ............ G06F 11/1076 714/5.11 |
| 8,127,165 | B2* | 2/2012 | Qi ............................ G06F 1/325 713/320 |
| 8,161,317 | B2* | 4/2012 | Ishii ...................... G06F 11/008 714/42 |
| 8,412,986 | B2* | 4/2013 | Ishii ...................... G06F 11/008 714/42 |
| 8,473,779 | B2 | 6/2013 | Siewert et al. |
| 8,495,276 | B2 | 7/2013 | Han et al. |
| 8,522,058 | B2* | 8/2013 | Chang ................... G06F 1/3203 713/310 |
| 8,583,838 | B1 | 11/2013 | Marshak et al. |
| 8,947,816 | B1 | 2/2015 | Ryan et al. |
| 2005/0228943 | A1* | 10/2005 | DeCenzo ............ G06F 11/1076 711/114 |
| 2006/0004868 | A1 | 1/2006 | Claudatos et al. |
| 2006/0062383 | A1 | 3/2006 | Kaneda et al. |
| 2006/0098804 | A1 | 5/2006 | Larzabal et al. |
| 2007/0220316 | A1 | 9/2007 | Guha |
| 2009/0089504 | A1 | 4/2009 | Soran et al. |
| 2009/0150593 | A1 | 6/2009 | Hamilton et al. |
| 2009/0249003 | A1 | 10/2009 | Bates et al. |
| 2010/0011229 | A1 | 1/2010 | Davis et al. |
| 2010/0138677 | A1 | 6/2010 | Pagan et al. |
| 2011/0239013 | A1* | 9/2011 | Muller .................. G06F 1/3221 713/320 |
| 2012/0210169 | A1 | 8/2012 | Coile et al. |
| 2012/0233484 | A1 | 9/2012 | Rossi |
| 2012/0272038 | A1 | 10/2012 | Wei et al. |
| 2012/0297114 | A1* | 11/2012 | Koizumi ............. G06F 12/0246 711/103 |
| 2013/0304963 | A1 | 11/2013 | Luo et al. |
| 2014/0263861 | A1 | 9/2014 | Pritchard et al. |
| 2014/0281194 | A1 | 9/2014 | Gaertner et al. |
| 2014/0297700 | A1 | 10/2014 | Vongsouvanh et al. |
| 2015/0026488 | A1 | 1/2015 | El-Batal et al. |
| 2015/0197330 | A1 | 7/2015 | Mayer et al. |
| 2015/0331476 | A1 | 11/2015 | Slik |
| 2015/0331632 | A1 | 11/2015 | Slik |
| 2015/0362972 | A1 | 12/2015 | Frick |
| 2015/0362983 | A1 | 12/2015 | Frick |
| 2015/0363109 | A1 | 12/2015 | Frick et al. |
| 2015/0363126 | A1 | 12/2015 | Frick |
| 2015/0363127 | A1 | 12/2015 | Frick |
| 2015/0363288 | A1 | 12/2015 | Frick |

OTHER PUBLICATIONS

Delaluz, et al., "Memory Energy Management Using Software and Hardware Directed Power Mode Control," Dept. of Computer Science & Engineering, Pennsylvania State University, Pennsylvania, 2001, 21 pages.

Deng, et al., "Architectures and Optimization Methods of Flash Memory Based Storage Systems," Journal of Systems Architecture 57, Department of Computer Science, Jinan University, China, 2011, 14 pages.

Dittia, et al, "The APIC Approach to High Performance Network Interface Design: Protected DMA and Other Techniques," Dept. of Computer Science, Washington University, St. Louis, MO, 1997, 24 pages.

Gibson, et al., "A Case for Network-Attached Secure Disks," School of Computer Science Carnegie Mellon University, Pittsburgh, PA, Sep. 1996, 19 pages.

Jin, et al., "High-speed Data Channel in the Disk Array System," Broadband European Networks and Multimedia Services 580, Sep. 1998, 2 pages.

Katz, Randy H., "High Performance Network and Channel-Based Storage," Computer Science Division, Dept. of EE and Computer Sciences, U.C Berkeley, CA, Sep. 1991, 41 Pages.

Kottke, Thomas, "An Economical Data Acquisition System for Measuring and Recording Multiple Channels of Information at High Rates," Army Research Laboratory, National Technical Information Service, U.S. Dept. of Commerce, Springfield, VA, Sep. 1995, 79 pages.

Kumon, Kouichi, "Overview of Next-Generation Green Data Center," Fujitsu Sci. Tech, vol. 48, No. 2, Apr. 2012, 7 pages.

Riedel, Erik, "Active Disks—Remote Execution for Network-Attached Storage," Dissertation, School of Computer Science Carnegie Mellon University, Pittsburgh, PA, Nov. 1999, 203 pages.

Tudor, et al., "On Understanding the Energy Consumption of ARM-based Multicore Servers," Sigmetrics, Dept. of Computer Science, National University of Singapore, 2013, 12 pages.

Vekiarides, Nicos, "Fault-Tolerant Disk Storage and File Systems Using Reflective Memory," Dept. of Electrical & Computer Engineering, Carnegie Mellon University, Pittsburgh, Pennsylvania, 1995, 11 pages.

Yousif, Mazin, "Shared-storage Clusters," Cluster Computing Journal abstract, vol. 2, Issue 4, North Carolina, Dec. 1999, 6 pages.

Author Unknown, "Adaptive Memory Technology in Solid State Hybrid Drives," Seatage, retrieved on Apr. 1, 2015, 3 pages, retrieved from http://www.seagate.com/tech-insights/adaptive-memory-in-sshd-master-ti/.

Author Unknown, "DX100," Quamtum, retrieved on May 13, 2015, 1 page, retrieved from: http://www.quantum.com/serviceandsupport/softwareanddocumentationdownloads/dx100/index.aspx.

* cited by examiner

COMMON CONTROLLER OPERATING MULTIPLE STORAGE DRIVES

CROSS-REFERENCE TO RELATED APPLICATIONS

The present application claims benefit of priority to U.S. Provisional Patent Application No. 62/012,205 entitled "Off-line/On-line Mass Data Storage Management" and filed on Jun. 13, 2014, and also claims benefit of priority to U.S. Provisional Patent Application No. 62/012,219 entitled "Off-line/On-line Mass Data Storage System" and filed on Jun. 13, 2014. Both of these applications are specifically incorporated by reference for all that they disclose or teach.

SUMMARY

Implementations disclosed herein provide for a mass data storage system comprising two or more storage drives; and a media unit controller configured to selectively connect a power supply and an in-band data signal to a selected one of the two or more storage drives.

Implementations disclosed herein further provide for a method of accessing data within a mass data storage system comprising selectively connecting a power supply and an in-band data signal to a selected one of two or more storage drives through a media unit controller of the mass data storage system.

Implementations disclosed herein still further provide for a mass data storage system comprising a power supply; two or more storage drives; a media unit controller configured to selectively connect the power supply and an in-band data signal to a selected one of the two or more storage drives, wherein the media unit controller includes: a host interface controller; a data access switch configured to connect a data signal between the host interface controller and the selected storage drive; a preamplifier switch configured to connect a preamplifier control signal from the host interface controller to the selected storage drive; a voice coil motor switch configured to connect the power supply to a voice coil motor of the selected storage drive; and a spindle motor switch configured to connect the power supply to a spindle motor of the selected storage drive; and a rack controller configured to direct the media unit controller to select the one of the two or more storage drives, wherein the rack controller is further configured to send data incoming to the mass data storage system and receive data outgoing from the mass data storage system through the media unit controller.

This Summary is provided to introduce a selection of concepts in a simplified form that are further described below in the Detailed Description. This Summary is not intended to identify key features or essential features of the claimed subject matter, nor is it intended to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
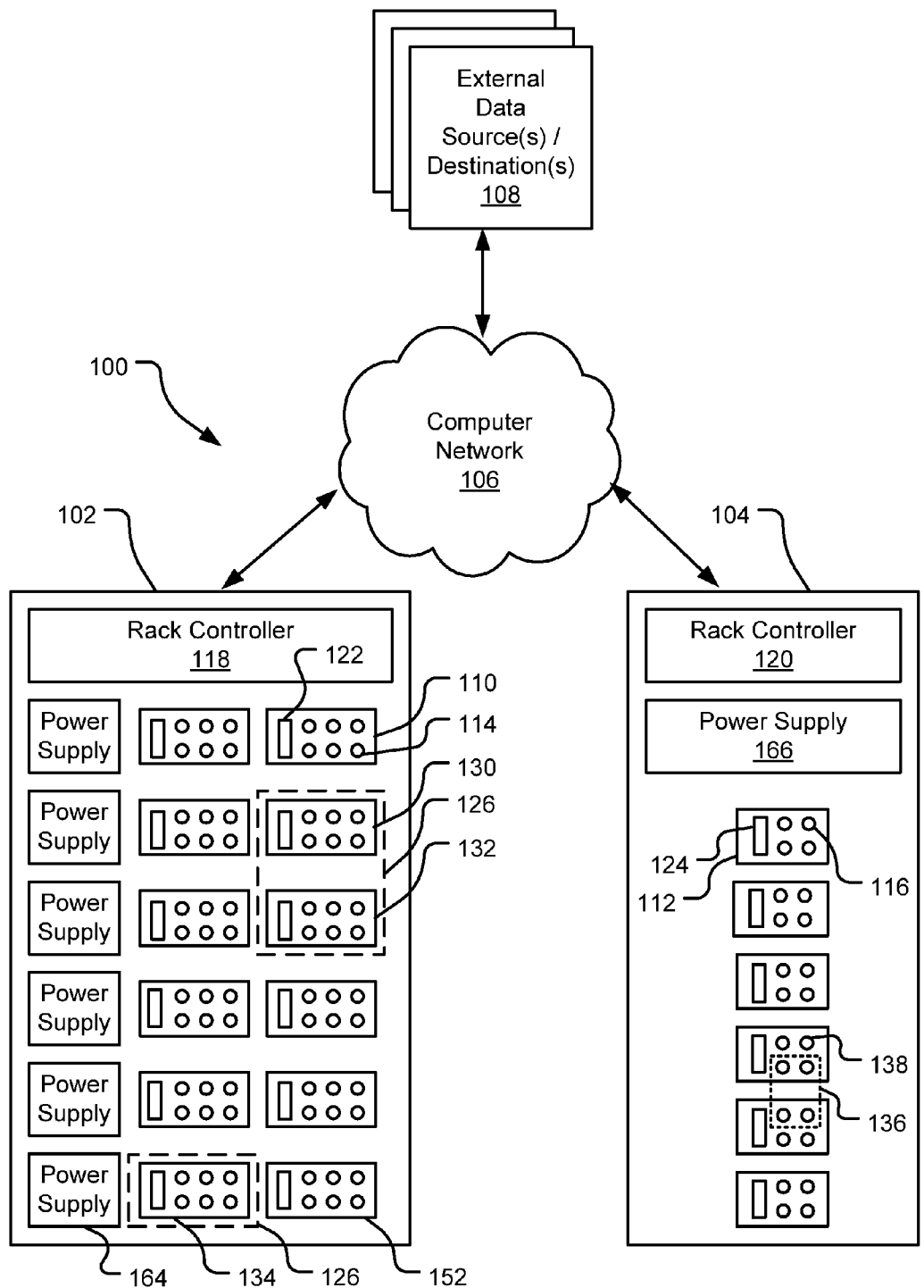
FIG. 1 illustrates an example mass data storage system with multiple media unit controllers; each media unit controller operating multiple storage drives within the system.

Efficient use of power is an important aspect of running data storage devices, especially in embodiments such as a data center environment designed to serve as a public or private cloud storage system. On-line mass data storage (sometimes referred to as secondary or cloud storage) refers to one or more interconnected data storage units that are actively running and available for data access operations (i.e., read and/or write operations). Example on-line mass data storage units include hard disk drives ("HDDs"), optical drives, solid state drives ("SSDs"), and flash memory. Typically, time to data ("TTD") for on-line mass data storage units is less than 2 milliseconds. On-line mass data storage benefits from very high TTD capabilities, but is expensive to build and operate. More specifically, individual on-line mass data storage units are typically of a relatively high quality, driving build costs up. The individual on-line mass data storage units also consume significant power in an on-line state, driving operating costs up.

Near-line (or near on-line) mass data storage refers to one or more interconnected data storage units that are powered on, but kept a low power consumption state when not in use and brought to an on-line state before running data access operations. Hard disk, optical, and/or flash memory drives may be used for near-line storage, with an additional mechanism to bring a selected storage unit to an on-line state for data access operations. Such example mechanisms are robotic near-line storage (i.e., the system is aware of where a desired data chunk resides on a physical volume and utilizes a robotic mechanism to retrieve the physical volume for data access operations) and HDD near-line storage (e.g., a massive array of idle discs ("MAID")). MAID systems archive data in an array of HDDs that are operating in a standby power state, most of which are not spinning. The MAID system spins up each HDD on demand when desired to perform data access operations on a disc within that drive. Typically, TTD for MAID-type near-line mass data storage units is less than 4 milliseconds. Near-line mass data storage systems have lower operating costs than on-line mass data storage systems due to the reduced power demand, but may have similar build costs.

Off-line (or cold) mass data storage refers to one or more interconnected data storage units that are kept in a power off state and/or utilize remotely located storage media to store data. Typically, off-line mass data storage utilizes one or more interconnected tape drives, each with numerous tapes associated with the drive. As discussed above with regard to robotic near-line storage, a desired tape is retrieved from its storage location and loaded into its associated drive for data access operations. In off-line tape mass data storage units, the desired tape is often manually retrieved and loaded. As a result, TTD for off-line tape mass data storage units can be greater than 24 hours. While the build and operating costs of off-line tape mass data storage are low, some applications require a faster access time than 24 hours, but not as fast as on-line or near-line mass data storage systems.

The disclosed off-line HDD mass data storage systems can achieve TTD much faster than that of off-line tape mass data storage while maintaining build and operating costs competitive with off-line tape mass data storage. This is accomplished, in part, with a common controller operating multiple drives via an array of switches within a mass data storage system.

FIG. 1 illustrates an example mass data storage system 100 with multiple media unit controllers (e.g., media unit controllers or zone boards 122, 124); each media unit controller operating multiple storage drives (e.g., storage drives 114, 116, 138) within the system 100. The storage system 100 (e.g., a server cluster or farm) includes a number of storage racks (e.g., storage racks 102, 104) oriented in adjacent or separate physical locations or facilities (e.g., data rooms or centers). In some implementations, a first quantity of storage racks is located in a first server facility, a second quantity of storage racks is located in a second server facility, and so on. The server facilities may be separated by any distance (e.g., several feet or many miles). The storage system 100 may accommodate any number of storage racks and each rack is located in one of any number of server facilities. The storage system 100 may accommodate any use of mass data storage (e.g., content delivery, backup, archiving, etc.).

The individual storage racks are interconnected to one another via a computer network 106 (e.g., an Ethernet or a custom interconnect network). Further, the interconnected storage racks may be connected to one or more external data source(s) and/or destination(s) 108 via the same computer network 106 or an additional interconnected network (e.g., a local area network ("LAN") or a wide area network ("WAN"), not shown). Communication between the storage racks 102, 104, computer network 106, and the external data source(s) and/or destination(s) 108 may occur using a variety of communication protocols (e.g., transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, and frame relay). As a result, data may be accessed and moved between the individual storage racks and the external data source(s) and/or destination(s) 108 as desired.

Each individual storage rack includes an array of storage media units (also referred to as physical zones), each of which selectively powered by one or more power supplies and controlled by a rack controller (alternatively referred to as a "storage rack server," a "storage system server," or an "expander"). For example, storage rack 102 includes 12 individual storage media units (e.g., storage media unit 110) and 6 individual power supplies (e.g., power supply 164), all of which are controlled by rack controller 118. Storage rack 104 includes 6 individual storage media units (e.g., storage media unit 112) and 1 power supply 166 controlled by rack controller 120. In some implementations, individual storage racks may include greater or fewer individual storage media units than the depicted 12 and 6 storage media units per storage rack and/or greater or fewer individual power supplies than the depicted 6 and 1 power supplies per storage rack. In other implementations, some racks may not include a rack controller at all. In such implementations, some or all of the functionality of the rack controller is moved to a rack controller in another rack and/or individual media unit controllers within the same rack. As a result, an individual rack controller may control multiple racks.

Each media unit within a storage rack includes an array of individual storage drives controlled by a media unit controller. For example, the media unit 110 includes 6 individual storage drives (e.g., the storage drive 114) controlled by the media unit controller (or zone board) 122. The media unit 112 includes 4 individual storage drives (e.g., the storage drive 116) controlled by the media unit controller 124. In other implementations, individual storage media units may include greater or fewer storage drives than the depicted 6 and 4 storage drives per media unit.

The power supplies may power multiple media units or a single media unit. For example, each power supply in storage rack 102 powers a pair of media units (e.g., power supply 164 powers media units 134, 152). Power supply 166 powers all 6 media units in storage rack 104. An upper end power capability of each individual power supply may determine how many storage drives may be operated simultaneously by that power supply, which may range from a single storage drive to multiple storage drives operating across the same or different media units. In still other implementations, an individual power supply may power multiple racks.

In some implementations, physical collections of media units and/or power supplies are selectively installed and uninstalled from a storage rack (e.g., configured as a blade, which corresponds to the storage rack physical configuration). In an example standard server-rack configuration, the individual storage racks are each subdivided into individual rack units (e.g., 42 rack units), where a pair of media units and one power supply are physically dimensioned to fill one rack unit (i.e., 19 inches wide by 1.75 inches tall). Each such storage rack can therefor accommodate a total of 84 media units and 42 power supplies. In other implementations, the storage rack and rack units are physically dimensioned to accommodate any desired number of media units and/or power supplies.

In one implementation, each storage drive is a distinct storage medium or set of storage media with a portion of the read/write control functionality of the storage drive removed to a corresponding media unit controller and/or rack controller of the mass data storage system 100. As a result, one or both of the media unit controller and/or the rack controller of the can selectively power (e.g., power-on, power-off, spin-up, spin-down, etc.) an individual storage drive as desired to read data from and/or write data to the storage drive without having to supply power to all storage drives within the system continuously. As used herein, the term "off state" refers to a state where no power is supplied to a storage drive and "on state" refers to any state where power is supplied to the storage drive. One example selective powering operation powers a storage resource from an off state to an on state. In the on state, the storage drive can perform normal data transfer operations (e.g., read and write operations).

Some read/write control functionality of the storage drives may be retained within the storage drives and thus not removed to the corresponding media unit controller or rack controller of the mass storage system 100. Such storage drives may retain self-powering resources and have the ability to effectuate a "power on" or "power off" mode change in response to communication from a rack controller or a media unit controller.

Some of the control hardware and software for each individual storage drive is removed to a corresponding media unit controller and/or rack controller, thereby centralizing control functions of the individual storage drives to a media unit level and/or a rack level. By moving some or all of the storage drive control hardware and software into the corresponding media unit controller and/or rack controller, the individual storage drives may have disparate characteristics (e.g., storage technology (e.g., magnetic, optical, semiconducting), performance characteristics and power characteristics). Further, the individual storage drives may utilize any available storage technology (e.g., magnetic storage, optical storage, semiconducting storage (e.g., flash-based solid state)).

Operation of the mass data storage system 100 may then be optimized based on the characteristics of the storage drives available within the system 100. In some implementations, each of the individual storage drives within a media unit has disparate characteristics, but each media unit has the same characteristics (i.e., similar within industry acceptable tolerances). In other implementations, the media units have disparate characteristics as well.

Drives with performance characteristics that meet an operational threshold may be characterized as having the same (or similar) performance characteristics. For example, a 4 terabyte drives have the capability of storing at least 4 terabytes of data and is formatted to store 4 terabytes of data. Drives that meet this threshold are referred to herein as having the same or similar storage capacity. Drives that do not have the capability of storing 4 terabytes of data and/or drives that are formatted to store a different quantity of data are referred to herein as having disparate storage capacity.

Drives with performance characteristics that maintain an operational target may also be characterized as having the same (or similar) performance characteristics. Similarly, a 7200 RPM storage drive may vary rotational speed from 7200 RPM by no more than 1% during data access operations. Drives that meet this operating limitation are referred to herein as having the same or similar rotational speeds. Drives that fail to meet this operating limitation are referred to herein as having disparate rotational speeds. Storage capacity and rotational speed are two example storage drive performance capabilities. Other performance capabilities are contemplated herein (e.g., read speed, write speed, host interface speed, security level (e.g., encoded or not encoded), etc.).

In some implementations, groupings of individual storage drives or media units with the same performance characteristics are defined by the corresponding media unit controller and/or rack controller as belonging to a common logical zone. For example, a logical zone may include a selection of individual media units within a storage rack that may or may not be physically adjacent within the storage rack. For example, logical zone 126 includes physically adjacent media units 130, 132 and non-adjacent media unit 134 within storage rack 102.

In other implementations, a logical zone includes a selection of individual storage drives within a storage rack that also may or may not be physically adjacent within the storage rack. For example, logical zone 136 includes a selection of 4 individual storage drives (e.g., storage drive 138) spanning two different media units and sharing power supply 166 within the storage rack 104. Groupings of individual storage drives or media units into logical zones may be made based on any criteria, and may even be arbitrary.

Each of the rack controllers 118, 120 are communicatively coupled to the media unit controllers within corresponding racks 102, 104, respectively, and media unit controllers (e.g., media unit controller 122) are communicatively coupled to an associated nest of storage drives (e.g., storage drive 114). Communication between the rack controllers, the media unit controllers, and the storage drives is accomplished via compute nodes, inter-integrated circuits ("I2C"), serial attached small computer system interface ("SAS"), serial advanced technology attachment ("SATA"), universal serial bus ("USB"), peripheral component interconnect express ("PCIe"), Ethernet, wireless channels, etc.

For example, in response to a read or write command, the mass data storage system 100 uses the detailed mapping of the power network and storage resources within the system 100 to identify available storage locations to receive data (if the command is a write command) or act as a data source (if the command is a read command). Using a number of power constraints and data requirements, the rack controller instructs one or more media units to each connect and power up a storage drive and ready it for data access operations. The media unit controllers switch power to the selected drive, power on the selected drive, and connect a read/write channel to the selected drive. After execution of the read or write command, the selected drives are returned to an off-line (powered off) state. Storage resources selectively powered for each data transfer operation (e.g., read operation or write operation) may be on the same or different media units and/or storage racks.

Figure 2:
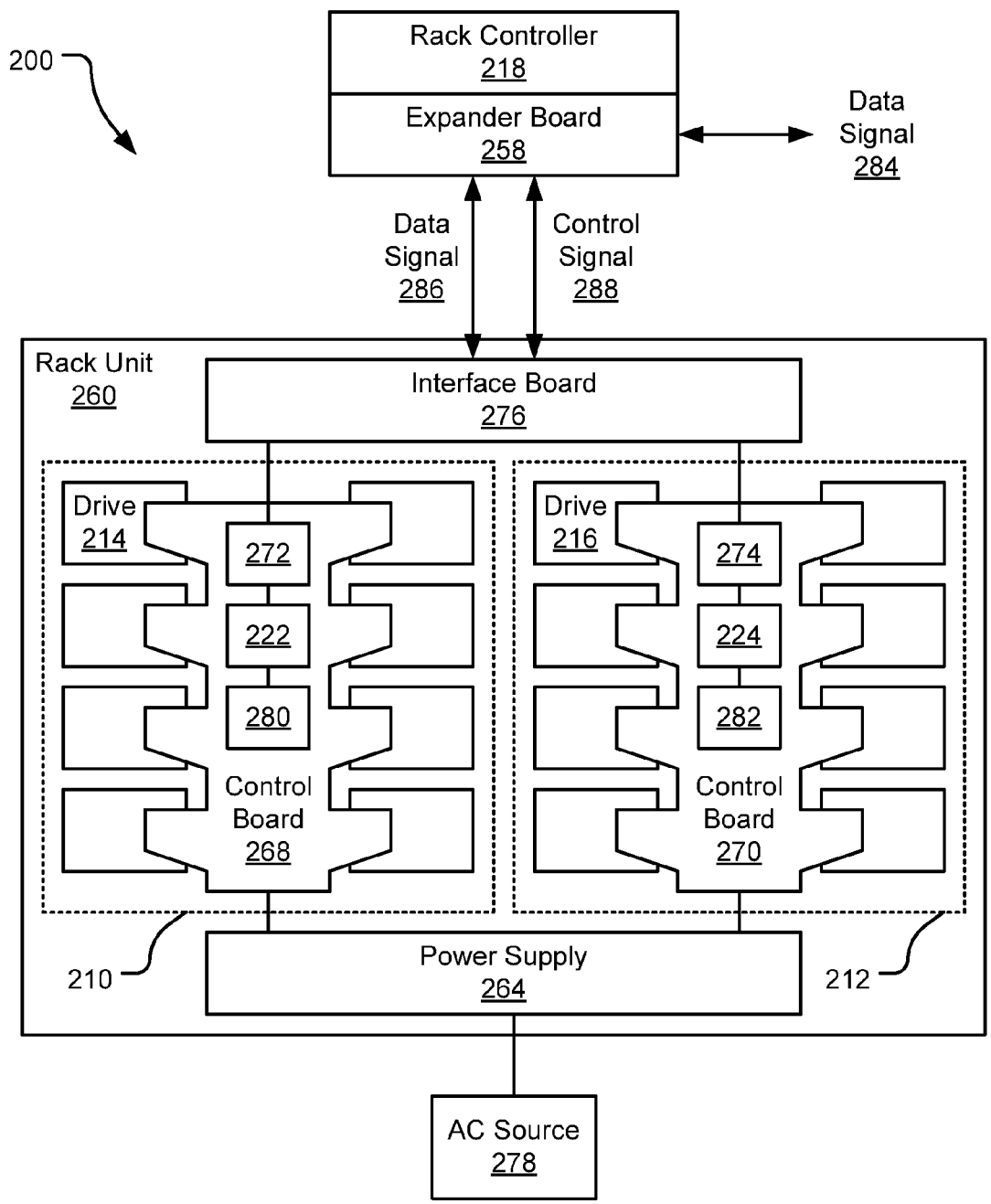
FIG. 2 illustrates an example rack unit containing two media unit controllers; each media unit controller operating multiple storage drives within a mass data storage system.

FIG. 2 illustrates an example rack unit 260 containing two media unit controllers 222, 224; each media unit controller operating multiple storage drives (e.g., storage drive 214) within a mass data storage system 200. In various implementations, a complete rack (see e.g., racks 102, 104 of FIG. 1) will include multiple rack units similar to rack unit 260. Further, a complete mass data storage system (see e.g., system 100) may include multiple racks of units similar to rack unit 260.

A rack controller 218 provides control functionality to the mass data storage system 200 generally, and specifically the rack unit 260 depicted in FIG. 2. The rack controller 218 includes an expander board 258, which connects the rack controller 218 to the rack unit 260 and an external computer network (see e.g., computer network 106 of FIG. 1). In various implementations, the expander board 258 utilizes a common data transfer communication standard (e.g., SAS) to send and receive data to and from the external computer network. The expander board 258 may also utilize the same or a different communication standard to send data to and receive data from the rack unit 260. The expander board 258 may also utilize a different communication standard (e.g., I2C) to provide control functionality to the rack unit 260.

The rack unit 260 includes two media units 210, 212, each of which may send and receive communication signals to and from the rack unit 260 over a variety of communication standards (e.g., I2C, SAS, SATA, USB, PCIe, Ethernet, wireless channels, etc.) via rack unit interface board 276. Further, the rack unit 260 and each of the two media units 210, 212 are powered by power supply 264, which is fed alternating current ("AC") power from AC source 278. In various implementations, the power supply 264 includes an electrical transformer that converts AC power to direct current ("DC") power, steps the input voltage down, and/or splits the input power to each powered component of the rack unit 260.

Media unit 210 includes the media unit controller 222 operating 8 individual storage drives (e.g., storage drive 214) via control board 268, which provides physical connections to each of the 8 individual storage drives. Media unit controllers are discussed with further detail below with reference to FIG. 3. Media unit 210 also includes a set of connectors 272 that communicatively connect to the interface board 276. Media unit 210 further includes any array of switches 280, which selectively power and communicatively connect the individual storage drives within the media unit 210 to the media unit controller 222. These switches are discussed with further detail below with reference to FIG. 3.

Media unit 212 includes the media unit controller 224 operating 8 individual storage drives (e.g., storage drive 216) via control board 270, which provides physical connections to each of the 8 individual storage drives. Media unit 212 also includes a set of connectors 274 that communicatively connect to the interface board 276. Media unit 212 further includes any array of switches 282, which selectively power and communicatively connect the individual storage drives within the media unit 212 to the media unit controller 224.

In various implementations, media unit 210 is identical to media unit 212. In other implementations, the number, type, and other properties of the individual storage drives may vary between media units (e.g., 2-12 individual storage drives per media unit). Further, control board topology (e.g., controllers, connectors, switches, etc.) may vary between media units. In some implementations the media units each have a dedicated power supply or one or more rack-level power supplies provide power to the rack unit 260.

In a first example data access operation, the expander board 258 receives a read request from an external network (see e.g., data signal 284). The rack controller 218 provides instructions to the rack unit 260 to power on and connect storage drive(s) that contain the requested data. In this example, we will assume that drive 216 contains the requested data. These instructions are embodied on a control signal 288 sent from the expander board 258 to the interface board 276 of the rack unit 260. The controller 224 of media unit 212 is connected to the interface board 276 via the media unit connectors 274. In response to the control signal 288, the media unit controller 224 causes switches 282 to power on and connect storage drive 216. In some implementations, a return control signal back to the rack controller 218 indicates a successful powering on and connection to the requested storage drive 216. The requested data is read from storage drive 216 and is communicated from the media unit 212 through the interface board 276 back to the rack controller 218 via the expander board 258 (see e.g., data signal 286). The read data is then sent out to a requesting device within the external network from the expander board 258 (see e.g., data signal 284).

In a second example data access operation, the expander board 258 receives a write request from the external network (see e.g., data signal 284). The rack controller 218 provides instructions to the rack unit 260 to power on and connect storage drive(s) that are intended to be the destination for the incoming data. In this example, we will assume that drive 216 is the intended destination for the incoming data. These instructions are embodied on a control signal 288 sent from the expander board 258 to the interface board 276 of the rack unit 260. The controller 224 of media unit 212 is connected to the interface board 276 via the media unit connectors 274. In response to the control signal 288, the media unit controller 224 causes switches 282 to power on and connect storage drive 216. In some implementations, a return control signal back to the rack controller 218 indicates a successful powering on and connection to the requested storage drive 216. The incoming data is communicated from the rack controller 218 via the expander board 258 to the media unit 212 through the interface board 276 and is written to storage drive 216 (see e.g., data signal 286). A confirmation that the data was successfully written to the storage drive 216 may be sent back to the rack controller 218 and/or a source device within the external network from the expander board 258 (see e.g., data signal 284).

Figure 3:
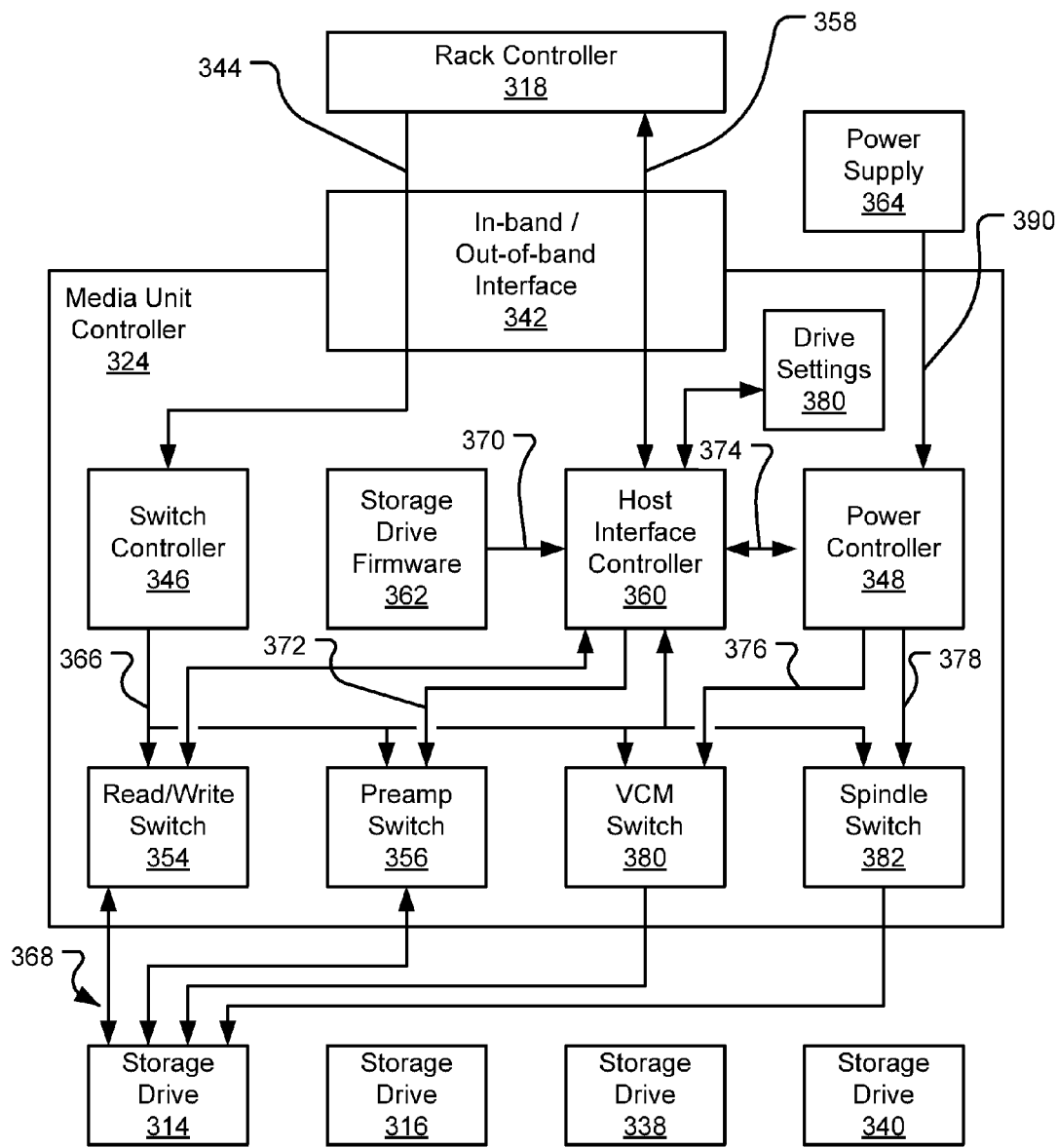
FIG. 3 illustrates an example media unit controller selectively operating one of an array of connected storage drives using instructions from a rack controller.

FIG. 3 illustrates an example media unit controller 324 selectively operating one of an array of connected storage drives 314, 316, 338, 340 using instructions from a rack controller 318. The rack controller 318 receives and orchestrates read/write requests within a corresponding rack of a mass data storage system (see e.g., racks 102, 104 of mass data storage system 100 of FIG. 1). The media unit controller 324 may take the form of one or more printed circuit board assemblies (PCBAs), peripheral interface controllers (also referred to as programmable interface controllers, programmable intelligent computers, or "PICs"), application-specific integrated circuits ("ASICs") and/or systems on chips (SoCs), for example.

In response to a read request, the rack controller 318 determines if the requested data is located within its associated rack and if so, where the requested data is specifically located. The specific location is defined at an address level on one or more storage drives within the rack. The rack controller 318 communicates with a media unit controller (e.g., media unit controller 324) to read the requested data from the storage drive(s) within the rack that contain the requested data via an in-band/out-of-band interface 342.

More specifically, the rack controller 318 sends an out-of-band signal 344 (e.g., (I2C, USB, RS-232, etc.) to a switch controller 346 (e.g., a PIC) that identifies which storage drive(s) contains the requested data. The out-of-band signal 344 is sent separately from the data signal itself (see in-band signal 358 discussed below). The switch controller 346 is connected to an array of switches 354, 356, 380, 382 that selectively connect components of the media unit controller 324 to the connected storage drives 314, 316, 338, 340. The switch controller 346 instructs the individual switches to select a desired drive (see arrows 366). In FIG. 3, switches 354, 356, 380, 382 illustrate a connection between the controller 324 and the storage drive 314 (see arrows 368). The switches 354, 356, 380, 382 are capable of selectively making an active connection to any one of the connected storage drives 314, 316, 338, 340 (here, storage drive 314). The storage drive selection via switches 354, 356, 380, 382 is also fed back to a host interface controller 360, informing the host interface controller 360 of the selected storage drive.

Simultaneously or subsequently to the switch controller 346 selecting the storage drive(s) that contain the requested data, the rack controller 318 sends an in-band signal 358 (e.g., SATA, SAS, PCIe, Fibre Channel, Ethernet, etc.) that contains a data signal (e.g., in a file format, an object format, or a block format) combined with metadata and/or data control information to the host interface controller 360. The host interface controller 360 controls read/write operations on the individual storage drives 314, 316, 338, 340 connected to the media unit controller 324 based on the data, metadata, and/or control information within the in-band signal 358. The host interface controller 360 accesses storage drive firmware 362 (e.g., dynamic random access memory ("DRAM")) to retrieve operating protocols on the active storage drive 314, as illustrated by arrow 370.

More specifically, the host interface controller 360 sends a preamp (or preamplifier) control signal via a serial interface or other command connection through preamp switch or preamplifier switch 356 (e.g., a multiplexer switch or MUX) to operate storage drive 314 (see arrow 372). Further, the host interface controller 360 instructs power controller 348 to provide power to the active storage drive 314 (see arrow 374). The power controller 348 shunts power from a power supply 364 (see arrow 390) through voice coil motor switch 380 (e.g., a field-effect transistor ("FET")) (see arrow 376) and a spindle motor switch 382 (e.g., also a FET) (see arrow 378). Feedback from the active storage drive 314 may also be received via the power controller 348 (e.g., confirmation of a successful power up of the storage drive 314). In other implementations, the power controller 348 may provide power to other components of the active storage drive 314 via additional switches.

The requested data is then read from the active storage drive 314 via a read/write switch or data access switch 354 (e.g., a radio frequency or microwave switch) back to the host interface controller 360, which sends the read data back to the rack controller 318 via the in-band/out-of-band interface 342 for transmission outbound from the mass data storage system.

Data read from the storage drive 314 and data written to the storage drive 314 is transmitted in the form of an analog signal between the host interface controller 360 and the storage drive 314 through the preamp switch 356. The read/write signal may be finely tuned to compensate for noise introduced by the preamp switch 356 and adjacent equipment between the host interface controller 360 and the storage drive 314. In some implementations, the preamp switch 356 is a radio frequency or microwave switch that minimizes such interference and the connections between the host interface controller 360 and the storage drive 314 are shielded to reduce/prevent noise from interfering with the read/write signal. Further, in some implementations, the preamp switch 356 is the same as or similar to a head switch used within a storage drive containing multiple heads.

In various implementations, the storage drives 314, 316, 338, 340 each have disparate performance characteristics, operating conditions, and/or configuration data. As a result, drive settings may be updated at the host interface controller 360 to ensure that data is properly written to the active storage drive 314. In one implementation, the host interface controller 360 is connected to a drive settings database 380 (e.g., electrically erasable programmable read-only memory ("EPROM")) and pulls configuration data (e.g., in the form of a configuration table) from the drives settings database 380 specific to the active storage drive 314. In some implementations, the host interface controller 360 consults the drive settings database 380 every time the media unit controller 324 performs a new power up operation.

In another implementation, the performance characteristics, operating conditions, and/or configuration data of the individual storage drives are stored on the storage drives themselves. One or more discrete locations on the connected storage drives is reserved for storing this information. The first operation once a power up operation is performed is to read these discrete location(s) to discover the configuration data of the active storage drive by performing a read operation on the reserved location(s) of the active storage drive (e.g., read a configuration file). The host interface controller 360 uses the read configuration data for future read/write operations on the active storage drive. In some implementations, the configuration data is stored in multiple predetermined locations to ensure data redundancy and reliability.

In various implementations, the functions of the switch controller 346, the host interface controller 360, and the power controller 348 are performed simultaneously or sequentially. Further, some functions of the media unit controller 324 may be contingent on success of a prior function (e.g., sending a read/write signal to a selected storage drive is contingent on receipt of confirmation that the selected storage drive was successfully powered up).

In response to a write request, the rack controller 318 determines where the data is to be written within the rack. The location is defined at an address level on one or more storage drives within the rack. The rack controller 318 communicates with the media unit controller 324 to write the data to the selected storage drive(s) via the in-band/out-of-band interface 342.

More specifically, the rack controller 318 sends an out-of-band signal 344 to the switch controller 346 that contains instructions on which storage drive(s) are selected for writing the incoming data. The switch controller 346 instructs the individual switches to select a desired drive (e.g., storage drive 314) and the storage drive selection is also fed back to the host interface controller 360. Simultaneously or subsequently to the switch controller 346 selecting the storage drive(s) for writing the incoming data, the rack controller 318 sends an in-band signal 358 that contains a data signal to the host interface controller 360. The host interface controller 360 utilizes storage drive firmware 362 to perform the requested write operation on the active storage drive (e.g., storage drive 314).

More specifically, the host interface controller 360 sends a preamp control signal to operate the storage drive 314. Further, the host interface controller 360 instructs the power controller 348 to provide power to the active storage drive 314. The power controller 348 shunts power from the power supply 364 through the voice coil motor switch 380 and the spindle motor switch 382. The incoming data is then written to the active storage drive 314 via the read/write switch 354. The host interface controller 360 communicates a successful write operation on the active storage drive 314 back to the rack controller 318, which may in turn communicate the successful write operation to the source of the incoming data.

In one implementation, the media unit controller 324 contains a majority, if not all of the control hardware that would normally be included in a typical storage drive. As a result, the media unit controller 324 can be shared among the connected storage drives 314, 316, 338, 340 reducing the unit cost of the individual storage drives. Further, the media unit controller 324 may incorporate some or all of the components and/or functionality of the rack controller 318. As a result, the rack controller 318 may be omitted and the media unit controller 324 may communicate directly with other media units within the rack and the mass data storage system overall. Further still, the rack controller 318 may incorporate some or all of the components and/or functionality of the media unit controller 324. As a result, the media unit controller 324 form and functionality may be reduced from that described with reference to FIG. 3.

In another implementation, the rack controller 318 communicates with the host interface controller 360 using a communication protocol that combines the in-band signal 358 and the out-of-band signal 344. The host interface controller 360 separates the combined signal and sends the out-of-band portion 344 to the switch controller 346 and processes the in-band portion 358 as described in detail above.

In some implementations, there is a fixed quantity of power supplies per storage rack (e.g., 1 power supply per rack, see power supply 166 of storage rack 104 of FIG. 1) and/or per media unit (e.g., 1 power supply per 2 media units, see power supply 164 powering media units 134, 152 of FIG. 1). As a result, the power supply 364 (or power supply 164 of FIG. 1) can only supply power to a fixed quantity of media units and/or storage drives simultaneously. The number of media units and/or storage drives that can be operated simultaneously depends on the power supply's maximum output as compared to the power demands on the individual media units and/or storage drives. The rack controller 318 includes logic that prevents exceeding the power demand from exceeding the power supply. This may be accomplished by, for example, limiting the maximum number of media units and/or storage drives operating simultaneously, monitoring varying power demands of individual media units and/or storage drives and ensuring that an adequate power buffer exists, and/or consulting a power demand listing and preventing the total power demand from exceeding the power supply.

In various implementations, the rack controller 318 takes into account power supply and demand within the rack in selecting a storage drive to power on for read/write operations. While the media unit controller 324 is discussed above in detail with reference to operation of an individual media unit, the media unit controller 324 may instead be in control of an entire logical zone (see e.g., logical zones 126, 136 of FIG. 1). As a result, there may be multiple or no media unit controllers in a particular media unit.

Aspects of the media unit controller 324 may be implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules, or other data resident in a modulated data signal, such as a carrier wave or other signal transport mechanism.

Figure 4:
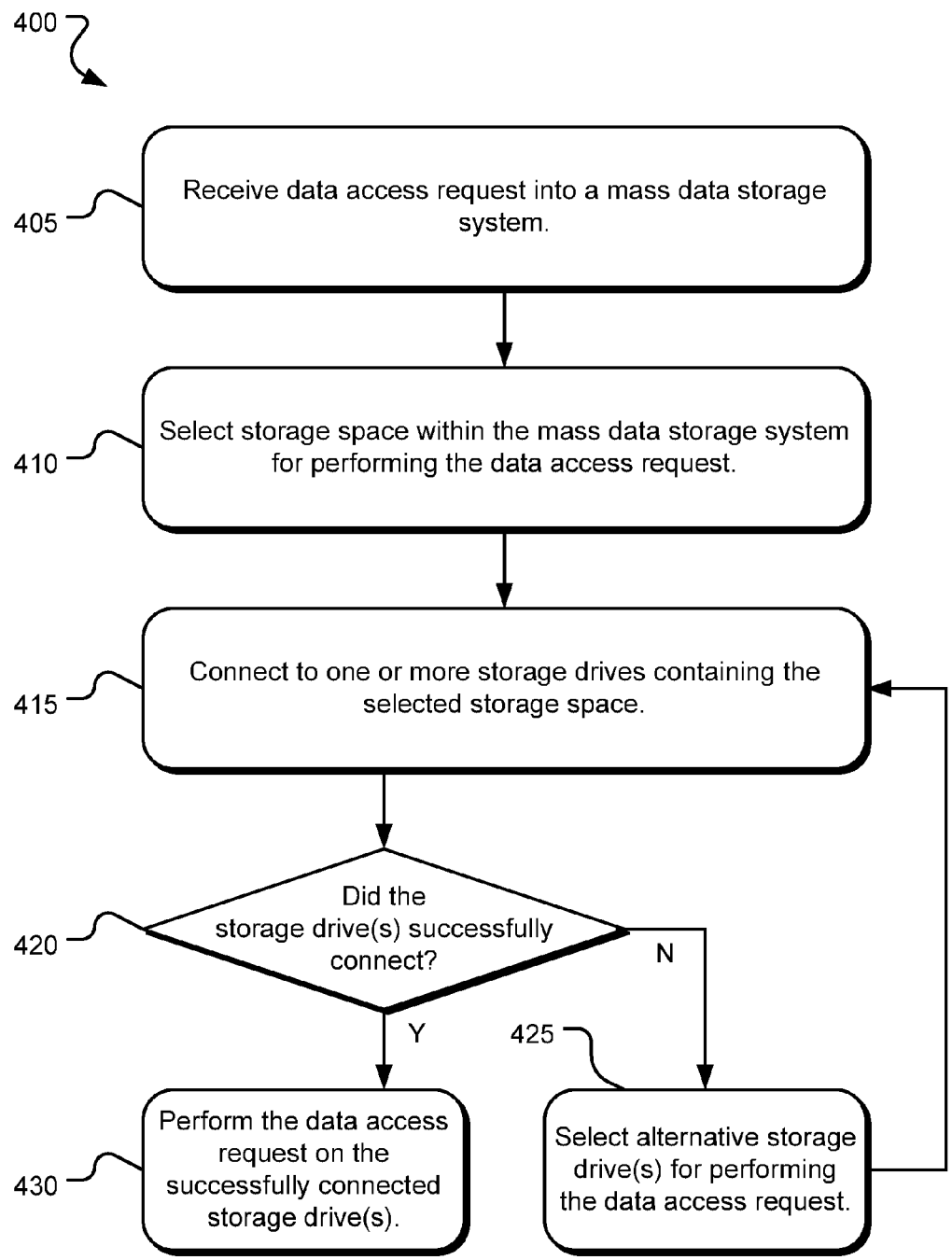
FIG. 4 illustrates example operations for performing data access operations on one of an array of connected storage drives using instructions from a common controller within a mass data storage system.

FIG. 4 illustrates example operations 400 for performing data access operations on one of an array of connected storage drives using instructions from a common controller within a mass data storage system. According to one implementation, the mass data storage system includes multiple racks, each including a rack controller, and an array of media units. Each of the media units comprises an array of individual storage drives and switches controlled by a media unit controller. One or more media units and/or one or more rack controllers within the mass data storage system may direct the operations 400.

A receiving operation 405 receives a data access request into the mass data storage system. In various implementations, the data access request includes one or both of a request to read data from the mass data storage system (a "read request") and a request to write data to the storage system (a "write request"). The data access request may be sourced from an external computer network for transferring data into or out of the mass data storage system or moving, copying, and/or deleting data within the mass data storage system. The data access request may also be sourced from within the mass data storage system in order to move, copy, and/or delete data within the mass data storage system.

A selecting operation 410 selects storage space within the mass data storage system for performing the data access request. In an example implementation depicted in FIG. 3, rack controller 318 sends instructions to switch controller 346 to select one or more storage drives (e.g., storage drive 314) containing the selected storage space. The switch controller 346 operates switches 354, 356, 380, 382 to select storage drive 314 for the data access request. More specifically, VCM switch 380 and spindle switch 382 connect the voice coil motor and the spindle motor of storage drive 314, respectively, to power controller 348. Read/write switch 354 and preamp switch 356 connect the preamp and read/write reads of storage drive 314 to host interface controller 360.

A connecting operation 415 connects to the one or more storage drives containing the selected storage space. More specifically, the connecting operation 415 connects an in-band data signal and an out-of-band control signal to an associated media unit and power to one or more storage drives connected to the media unit. Again, referring to FIG. 3, the rack controller 318 sends instructions to the host interface controller 360 to power up and perform the data access operation on storage drive 314. Power controller 348 shunts power from power supply 364 to the VCM, spindle motor, and/or other components of the active storage drive 314 via at least switches 380, 382.

A decision operation 420 determines whether the selected storage drive(s) successfully connected. Again, referring to FIG. 3, if the selected storage drives and associated media units were successfully connected, the power controller 348 may send a confirmation that the storage drive(s) are now available for data access operations to host interface controller 360.

If one or more of the selected storage drive(s) failed to connect successfully, the power controller 348 may send the host interface controller 360 notice that the failed storage drive(s) are not available for data access operations. A selecting operation 425 selects one or more alternative storage drive(s) for performing the data access request. Again referring to FIG. 3, the host interface controller 360 communicates that storage drive(s) failed to connect successfully to the rack controller 318. The rack controller 318 may then select alternative storage drive(s) for the data access operations. In other implementations, the host interface controller 360 or the power controller 348 may automatically select alternative storage drive(s) to replace the storage drive(s) that failed to successfully connect.

Once the selected storage drives are successfully connected, a performing operation 430 performs the data access request on the storage drives. Referring again to FIG. 3, the host interface controller 360 sends data to or receives data from the selected storage drive 314 via the read/write switch 354. The data passes through interface 342 to or from the rack controller 318.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
a power supply;
two or more storage drives coupled to the power supply;
a media unit controller configured to selectively connect the power supply and a data signal to a selected one of the two or more storage drives without connecting the power supply to at least one other storage drive of the two or more storage drives, wherein the media unit controller includes:
  a host interface controller;
  a data access switch configured to connect the data signal between the host interface controller and the selected storage drive;
  a preamplifier switch configured to connect a preamplifier control signal from the host interface controller to the selected storage drive; and
  a rack controller including a removed portion of read and write functionality of the two or more storage drives configured to direct the media unit controller to select the one of the two or more storage drives, the rack controller further configured to send data incoming to the mass data storage system and receive data outgoing from the mass data storage system through the media unit controller.

2. The system of claim 1, wherein
the power supply is located external to the two or more storage drives and the two or more storage drives deriving a majority of power from the power supply; and
the media unit controller including a majority of control hardware to control the two or more storage drives.

3. The system of claim 1, wherein the data signal is received by the media unit controller in-band and includes one or more of a read request, a write request, data read from the selected storage drive, data written to the selected storage drive, metadata, and data control information.

4. The system of claim 1, wherein the data signal is in one or more of SATA, SAS, PCIe, Fibre Channel, and Ethernet format.

5. The system of claim 1, wherein the media unit controller is further configured to receive an out-of-band control signal from a switch controller that connects to the selected storage drive.

6. The system of claim 5, wherein the out-of-band control signal identifies the selected one of the two or more storage drives.

7. The system of claim 5, wherein the out-of-band control signal is in one or more of I2C, USB, and RS-232 format.

8. The system of claim 1, wherein the data access switch is one of a radio frequency switch and a microwave switch.

9. The system of claim 1, wherein the preamplifier switch is a multiplexer.

10. The system of claim 1, wherein the media unit controller includes a voice coil motor switch configured to connect the power supply to a voice coil motor of the selected storage drive and a spindle motor switch configured to connect the power supply to a spindle motor of the selected storage drive.

11. The system of claim 10, wherein the voice coil motor switch and the spindle motor switch are field-effect transistors.

12. The system of claim 1, wherein the two or more storage drives have disparate performance characteristics.

13. A method of accessing data within a mass data storage system comprising:
selectively connecting, through a media unit controller of the mass data storage system, a power supply and a data signal to a selected one of two or more storage drives without connecting the power supply to at least one other storage drive of the two or more storage drives sharing the power supply;
directing the media unit controller to select the one of the two or more storage drives with a rack controller including a removed portion of read and write functionality of the two or more storage drives; and
wherein the selectively connecting operation includes:
  connecting the data signal between a host interface controller and the selected storage drive with a data access switch;
  connecting a preamplifier control signal from a host interface controller to the selected storage drive;
  connecting the power supply to a voice coil motor of the selected storage drive; and
  connecting the power supply to a spindle motor of the selected storage drive.

14. The method of claim 13, further comprising:
selectively connecting an out-of-band control signal to a switch controller that connects the selected storage drive.

15. The method of claim 13, further comprising one or both of:
sending data incoming to the mass data storage system through the media unit controller; and
receiving data outgoing from the mass data storage system through the media unit controller.

16. The method of claim 13, wherein the data signal is in one or more of SATA, SAS, PCIe, Fibre Channel, and Ethernet format.

17. The method of claim 14, wherein the out-of-band control signal is in one or more of I2C, USB, and RS-232 format.

18. The method of claim 15, wherein the data signal is received by the media unit controller in-band and includes one or more of a read request, a write request, data read from the selected storage drive, data written to the selected storage drive, metadata, and data control information.

19. A system comprising:
a power supply;
two or more storage drives coupled to the power supply;
a media unit controller configured to selectively connect the power supply and a data signal to a selected one of the two or more storage drives without connecting the power supply to at least one other storage drive of the two or more storage drives, wherein the power supply is configured to continuously provide power to the media unit controller and selectively provide power to the two or more storage drives, and the media unit controller includes:
  a host interface controller;
  a data access switch configured to connect the data signal between the host interface controller and the selected storage drive;
  a preamplifier switch configured to connect a preamplifier control signal from the host interface controller to the selected storage drive; and a rack controller including a removed portion of read and write functionality of the two or more storage drives configured to direct the media unit controller to select the one of the two or more storage drives, the rack controller further configured to send data incoming to the mass data storage system and receive data outgoing from the mass data storage system through the media unit controller.

\* \* \* \* \*